(12) United States Patent
Lim et al.

(10) Patent No.: US 6,584,229 B1
(45) Date of Patent: Jun. 24, 2003

(54) MACROBLOCK-BASED OBJECT-ORIENTED CODING METHOD OF IMAGE SEQUENCE HAVING A STATIONARY BACKGROUND

(75) Inventors: Young Kwon Lim, Taejon (KR); Sang Gyu Park, Taejon (KR); Chie Teuk Ahn, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 0 days.

(21) Appl. No.: 09/497,138

(22) Filed: Feb. 3, 2000

(30) Foreign Application Priority Data

Aug. 30, 1999 (KR) .............................................. 99-36258

(51) Int. Cl.[7] .................................................. G06K 9/36
(52) U.S. Cl. ...................................................... 382/243
(58) Field of Search ................................. 382/232, 236,
382/238, 240, 248, 250; 348/384.1, 394.1–395.1,
400.1–404.1, 407.1–416.1, 420.1–421.1,
425.2, 430.1, 431.1; 375/240.02, 240.03,
240.12, 240.13, 240.14, 240.15, 240.16,
240.18, 240.2, 240.22, 240.23, 240.24,
240.25

(56) References Cited

U.S. PATENT DOCUMENTS 6,005,980 A  * 12/1999 Elfrig et al. ................. 382/236
6,307,976 B1 * 10/2001 Chun et al. .................. 382/243
6,459,732 B2 * 10/2002 Chen et al. ............. 375/240.08

\* cited by examiner

*Primary Examiner*—Jose L. Couso
(74) *Attorney, Agent, or Firm*—Jacobson Holman PLLC

(57) ABSTRACT

A method, for an use at an macroblock-based object oriented coding of image sequence having a stationary background comprising the steps of: dividing a background region and an object region from an inputted video; determining an coding techniques, for an individual macroblock belonging to each divided region, as a macro block-based object-oriented coding of image sequence having a stationary back ground or a discrete cosine transformation object-oriented coding of image sequence having a moving object region; coding the method information, by which each macroblock is coded, on condition that the total area of each region is identical to the area of the screen; and storing or transmitting the coded data.

6 Claims, 1 Drawing Sheet

MACROBLOCK-BASED OBJECT-ORIENTED CODING METHOD OF IMAGE SEQUENCE HAVING A STATIONARY BACKGROUND

FIELD OF THE INVENTION

The present invention relates to a method and apparatus for providing macroblock-based object-oriented coding method of image sequence having a stationary background, which is capable of providing a real time coding process of the image sequence at a low-performance system and reducing the size of video information to be transmitted or stored in an effective manner.

DESCRIPTION OF THE PRIOR ART

Since a video telephone system utilizing moving picture generally uses a communication channel having a extremely limited transmission bandwidth, it is unavoidable to compress image signals in order to reduce the size of video information to be transmitted. One of conventional video compression techniques for reducing the size of information is an object-based coding technique, by which an image is divided into a back ground region and a foreground object region and each region is encoded separately. That is, the input image signal is divided into the background region having little motion and changes, and the foreground object region having large motion and changes, wherein the input image signal includes a plurality of video frames and each frame includes a multiplicity of macro-blocks, each macroblock having 16×16 pixels. Each divided region is coded by using a conventional macro block-based image coding technique, such as known discrete cosine transformation and quantization techniques. In addition, shape information representing each divided region is separately coded and transmitted in order to reconstruct the image signal at a receive side.

Therefore, it is very important to efficiently divide the image signal into two regions and to code the shape information of each divided region at the very high compression rate in order to maximize the coding efficiency. A conventional region division technique divides the image signal in a pixel unit by use of temporal change information or spatial change information of the image signal. That is, the video is divided into a plurality of the regions according to estimating the brightness-change in the pixel unit, thereby, each pixel is estimated as a back ground region or an object region. And such a shape information of a pixel-unit is coded by the chain-type around the outline of each region.

Since very complicated processes should be executed in order to divide the video by the pixel unit in the case of using the object-based coding technique utilizing the conventional region division technique, it is difficult to embody such processes in real time. In addition, the conventional arts may reach a limitation to maximize the coding efficiency, because lots of bits are consumed in order to code and transmit the shape information of each region acquired by pixel unit. The coding rate of the shape information could not be lowered below a certain level, even though a total coding rate is lowered. Therefore, there is a problem that the merit of the object-based coding technique is not utilized efficiently in the case of coding at the low bit rate.

SUMMARY OF INVENTION

It is, therefore, an object of the present invention to provide macroblock-based object-oriented coding method of image sequence having a stationary background which can be coded at a low coding bit rate, hereupon it is possible to embody such processes in real time at a low-performance system and to simply code the shape information of each region with the help of dividing a video not by pixel unit but by 16×16 pixels-sized macroblock-unit, and with the help of dividing the video into two regions and coding each region in order to solve the above-mentioned problems.

In order to achieve the mentioned objects, the present invention comprises: the first step, wherein the inputted video is to be divided into an background region and a foreground object region by unit of macroblock; the second step, wherein an appropriate coding technique for each macroblock, which belongs to the determined region, is to be determined; the third step, wherein a shape information of each region is to be coded according to above-determined coding technique; the forth step, wherein the pixel information of each region is to be coded after determining whether a pixel information for each macroblock is to be coded; and the fifth step, wherein the coded bitstream is to be transmitted or stored.

BRIEF DESCRIPTION OF THE DRAWING

The objects and features of the present invention will become apparent from the following description of preferred embodiments given in conjunction with the accompanying drawings, in which.

DETAILED DESCRIPTION OF THE PREFERRED EMBODIMENTS

Figure 1:
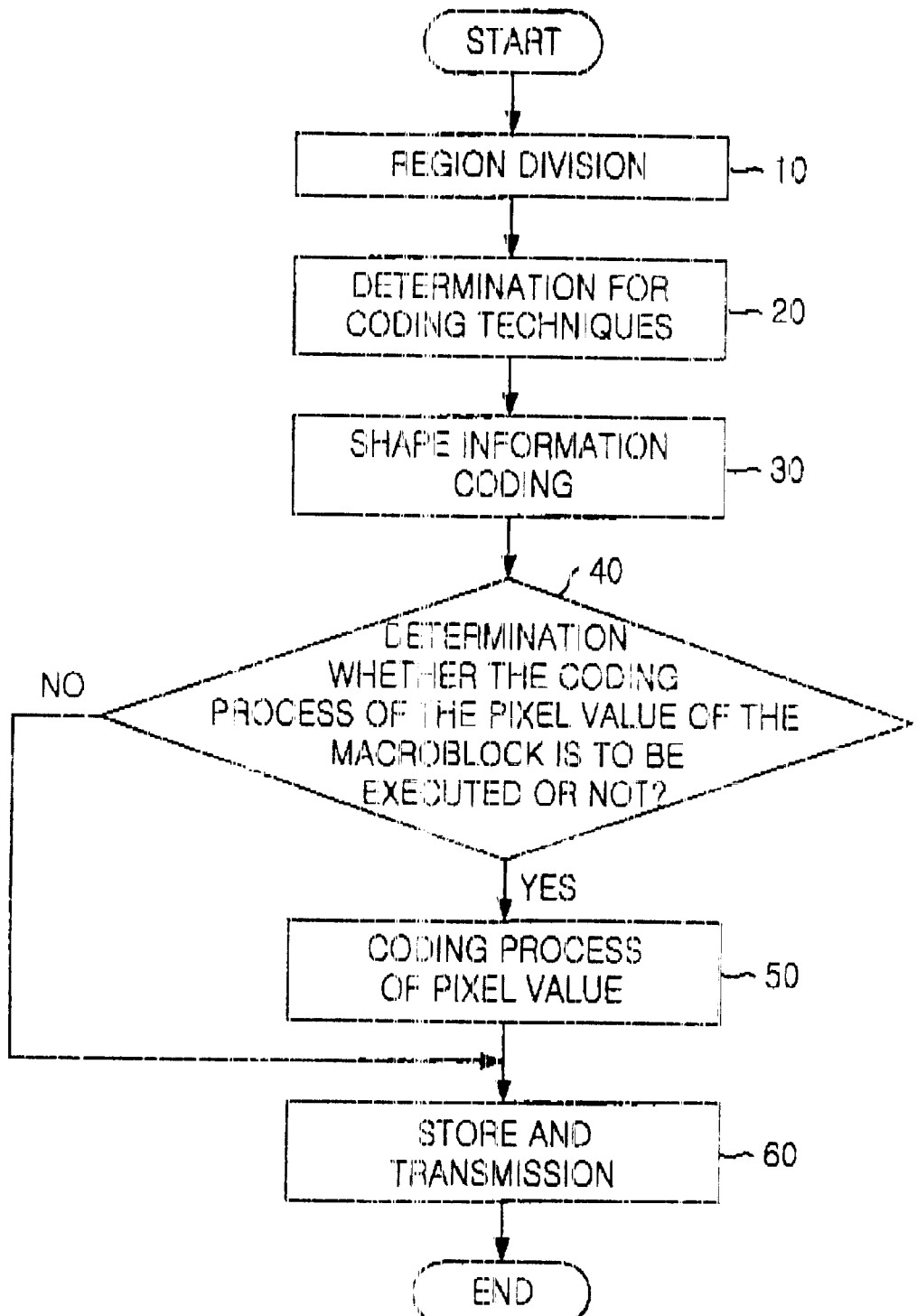
FIG. 1 is a flow chart for illustrating a macroblock-based object-oriented coding technique of a video having a stationary background in accordance with the present invention.

Hereinafter, a preferred embodiment of the present invention will be explained in conjunction with the accompanying drawings.

FIG. 1 is a high level flow-chart of the object-oriented coding technique in accordance with the present invention.

The input image or video signal includes a plurality of video frames and each frame includes a multiplicity of macro-blocks, each macroblock having 16×16 pixels.

First, the video signal is divided into a macroblock-based stationary back ground region and a macroblock-based moving object region by using the difference between a previous frame of the input video signal and a current frame of the input video at step 10. An appropriate selection among the well-known techniques for such a region division technique is utilized, i.e. macroblock-based region division technique and a background mosaicking technique is utilized for the present invention. According to the above mentioned techniques, a test statistic is acquired by using the brightness difference between two input frames. And then each macroblock is divided into a changing region and a unchanging region by comparing this test statistic with the predetermined threshold value, thereon each macroblock is distinguished as a foreground object region and a back ground region. Hereby, the back ground region generated in accordance with the above mentioned technique is the mosaic of the background region.

After the region distinction is completed, a coding technique is determined for the macroblock belonging to each region at step 20. At this step, the difference between the pixel value of the macroblock belonging to each region of the present frame and the pixel value of the macroblock belonging to the identical position of each region of the reconstructed previous frame. When this difference value is not bigger than the predetermined threshold value, it is determined that the macroblock data of the reconstructed previous frame is to be utilized. On the other hand, when this difference value is bigger than the predetermined threshold value, it is determined that the macroblock data of the current frame is to be coded by well-known macroblock coding technique.

According to each coding technique determined by the above-mentioned way, the shape information of each region is coded at step 30. Macroblocks in the regions are categorized in three types in this shape coding technique, i.e., the pixel value of the macroblock of the current frame is to be coded for the macroblock, the pixel value of the macroblock of the reconstructed previous frame is to be reused, and the pixel value of the macroblock does not exist in the selected region. The information, that the macroblock belongs to which type among the three types, is to be coded.

The process for determining whether the coding process of the pixel value of the macroblock is to be executed or not is to be performed at step 40. In the case of coding the pixel value, the coding process of the pixel value of each macroblock is to be executed. Hereto, a discrete cosine transformation, which is a widely used as a conventional video coding technique, i.e., a general coding technique, is executed for transformation, then quantization and variable-length coding technique is executed. Such coded data through these processes can be stored at the media, e.g., CD-Rom, or transmitted via a telecommunication network in accordance with the coding machine's purpose.

While the principal and the spirit of the present invention has been described entirely in accordance with the preferred embodiment, it is to be noticed that the embodiment is only illustrative and is not restricted to the limit. In addition, those skilled in the art would appreciate that other modification and variations may be made without departing from the spirit and scope of the present invention as set forth in the following claims.

What is claimed is:

1. A method, for use in an macroblock-based object oriented coding of a image signal, wherein the image signal has a stationary background region and an object region and contains a current frame and a previous frame, each frame including a plurality of macroblocks, comprising the steps of:

a) dividing the stationary background region and the object region from an inputted video in a macroblock-by-macroblock basis by using a difference between the previous frame and the current frame;

b) coding shape information of the object region by using a known coding technique to generate coded shape information;

c) coding pixel information of each macroblock contained in the object region by using a selected known coding technique to generate coded object pixel information;

d) generating coded pixel information of a previous frame macroblock corresponding to each current frame macroblock contained in the stationary background region as coded stationary pixel information; and e) storing or transmitting coded data coded shape information, coded object pixel information and coded stationary pixel information as coded image signal, and wherein the step d) includes the step of reusing corresponding coded pixel information macroblock contained in the previous frame without coding the pixel information of each macroblock contained in the current frame when a difference between a pixel value of the macroblock of the current frame and that of the macroblock of the previous frame in the same position is identical to or smaller than a predetermined threshold value.

2. The method as recited in claim 1, wherein the step a) includes the step of dividing all macro-blocks as the stationary background region and the moving object region, or foreground object regions and background regions by comparing test statistics which is a difference between the pixel value of the macroblock of the current frame and that of the macroblock of the previous frame in the same position, with the predetermined threshold value.

3. The method as recited in claim 1, wherein the step c) includes the steps of coding pixel information of each macroblock contained in the current frame when a difference between a pixel value of the macroblock of the current frame and that of the macroblock of the provious frame in the same position is bigger than a predetermined threshold value.

4. The method as recited in claim 1, wherein the step a) includes coding determination, wherein the macroblocks in the regions are categorized in three types in this shape coding technique, i.e., the pixel value of the macroblock of the current frame being coded for the macroblock, the pixel value of the macroblock of a reconstructed previous frame being reused, and a pixel value of the macroblock not existing in the selected region, as a result, the coding determination that the macroblock belongs to which type among the three types, being coded.

5. The method as recited in claim 1, wherein the known coding technique includes a discrete cosine transformation, a quantum-transformation, and a coefficient variable length transformation.

6. The method as recited in claim 1, wherein the storage and transmission are a computer readable media and communication network.

\* \* \* \* \*